(12) United States Patent
Chandler

(10) Patent No.: US 8,464,611 B1
(45) Date of Patent: Jun. 18, 2013

(54) MODULAR AND ADJUSTABLE AXLE SYSTEMS FOR VEHICLES

(76) Inventor: Ira Chandler, Ball Ground, GA (US)

( * ) Notice: Subject to any disclaimer, the term of this patent is extended or adjusted under 35 U.S.C. 154(b) by 316 days.

(21) Appl. No.: 12/783,925

(22) Filed: May 20, 2010

Related U.S. Application Data

(60) Provisional application No. 61/179,750, filed on May 20, 2009.

(51) Int. Cl.
*F16H 57/02* (2006.01)

(52) U.S. Cl.
USPC .......................................... 74/607

(58) Field of Classification Search
USPC . 74/606 A, 607; 475/200, 201, 202; 180/253, 180/254, 255, 258; 280/93.512, 93.515
See application file for complete search history.

(56) References Cited

U.S. PATENT DOCUMENTS

| | | | |
|---|---|---|---|
| 2,775,307 A * | 12/1956 | Hill ............................... | 180/257 |
| 3,420,327 A * | 1/1969 | Nallinger et al. ............. | 180/255 |
| 4,391,351 A * | 7/1983 | Jirousek et al. ............. | 188/18 A |
| 6,058,805 A * | 5/2000 | Merkler ......................... | 74/607 |
| 2007/0145816 A1 * | 6/2007 | Gile .............................. | 301/132 |

* cited by examiner

*Primary Examiner* — Vicky Johnson
(74) *Attorney, Agent, or Firm* — Hope Baldauff, LLC

(57) ABSTRACT

Concepts and technologies described herein provide for a modular and adjustable axle system for vehicles. According to one aspect of the disclosure provided herein, an axle housing system includes a central differential housing, a pair of retainers attached to the central differential housing, a pair of bell housings attached to the retainers, a pair of axle tube housings attached to the bell housings, and a pair of inner steering knuckles attached to the axle tube housings. Other aspects further include a drivetrain system within the axle housing system that includes a differential, a pair of inner constant velocity (CV) joints attached to opposing sides of the differential, a pair of axle shafts attached to the inner CV joints, and a pair of outer CV joints attached to the axle shafts, wherein the CV joints are maintained in a fixed angular relationship.

17 Claims, 8 Drawing Sheets

MODULAR AND ADJUSTABLE AXLE SYSTEMS FOR VEHICLES

CROSS-REFERENCE TO RELATED APPLICATIONS

This application claims priority to U.S. Provisional Patent Application No. 61/179,750, filed on May 20, 2009, and entitled "Modular and Adjustable Axle Systems for Vehicles," which is expressly incorporated herein by reference in its entirety.

BACKGROUND

Off-road vehicles are commonly subjected to extreme conditions and terrain. Ground clearance, or the distance between the lowest component of the vehicle and the ground, is extremely important to off-road vehicle utility. The greater the ground clearance of a vehicle, the larger the obstacles that the vehicle is capable of traversing without contacting the underside of the vehicle. Typically, the lowest vehicle component is the driven axles' differential housing that encompasses the vehicle differential that translates the longitudinal rotation of the driveshaft to the lateral rotation of the vehicle axle shafts. A conventional vehicle drivetrain configuration includes a differential housing having axle shafts extending horizontally and collinearly outwards from the differential housing to the vehicle wheels. Because a traditional differential housing protrudes below the axle shafts, it is the lowest drivetrain component and can be first to contact ground obstacles, rendering the differential highly susceptible to impeded forward motion and/or damage.

Typically, to increase the ground clearance of an off-road vehicle, the vehicle may be fitted with tires having a larger radius than an on-road tire. The larger radius translates into raising the vehicle and corresponding drivetrain components by an amount equal to the radius increase of the tire. However, the larger the tire, the greater the power requirement to turn it, which translates into a greater engine capacity. The amount of shear forces exerted against the drivetrain components also increases with the increase in tire radius. Ultimately, the size of the tire is limited by the strength of the wheel hub and axle. Typically, the stronger the axles, the greater the weight and cost of the axle assembly.

Another typical solution to increasing the ground clearance of a vehicle is to utilize a portal axle. Portal axles add housings at the outside ends of the axles that have a vertical component hanging down from the conventional axle. Typically, this component contains reduction gears and corresponding stub axles such that the axle rotation is transferred to the lower stub axles to drive the wheels. However, portal axles are significantly heavier and weaker than traditional axle configurations due to the gearing and stub axle tangential forces.

With respect to these considerations and others, the disclosure made herein is presented.

SUMMARY

This Summary is provided to introduce a selection of concepts in a simplified form that are further described below in the Detailed Description. This Summary is not intended to be used to limit the scope of the claimed subject matter.

Systems described herein provide for a vehicle axle configuration that allows for the vehicle axles to be angularly displaced from a differential housing to increase the ground clearance under the differential housing or to otherwise offset the wheels in any orientation relative to the differential housing. According to aspects presented herein, an axle system for a vehicle includes a central differential housing, a pair of retainers attached to the central differential housing, a pair of bell housings attached to the retainers, a pair of axle tube housings attached to the bell housings, and a pair of inner steering knuckles attached to the axle tube housings.

According to other aspects of the disclosure, an axle system for a vehicle includes a fixed axle housing system and a drivetrain system installed within the fixed axle housing system. The fixed axle housing system includes a central differential housing, a pair of bell housings attached to opposing sides of the central differential housing, a pair of axle tube housings attached to the bell housings, and a pair of steering knuckles attached to the axle tube housings. The drivetrain system includes a differential within the central differential housing, a pair of inner constant velocity (CV) joints attached to opposing sides of the differential and positioned within the bell housings, a pair of axle shafts attached to the inner CV joints and positioned within the axle tube housings, and a pair of outer CV joints attached to the axle shafts. These CV joints may be of any design that accomplishes the required constant rotational velocity.

According to yet other aspects, an axle system for a vehicle includes a fixed axle housing system and a drivetrain system installed within the fixed axle housing system. The fixed axle housing system includes a central differential housing, and from each side of the central differential housing, includes a bell housing, an axle tube housing attached to the bell housing, and a steering knuckle attached to the axle tube housing. The bell housing is clockably attached to the central differential housing via a retainer and encompasses an inner CV joint and an end of an axle shaft attached to the inner CV joint. The clockable bell housing defines a fixed drop angle corresponding to a non-zero angle from horizontal from which the axle shaft is directed from the central differential housing. The drivetrain system includes a differential positioned within the central differential housing and from each side, includes an attached inner CV joint, an axle shaft attached to the inner CV joint at the non-zero angle defined by the bell housing, and an outer CV joint attached to the axle shaft and configured to attach to a wheel spindle.

The features, functions, and advantages discussed herein can be achieved independently in various embodiments of the present disclosure or may be combined in yet other embodiments, further details of which can be seen with reference to the following description and drawings.

BRIEF DESCRIPTIONS OF THE DRAWINGS

DETAILED DESCRIPTION

Figure 1:
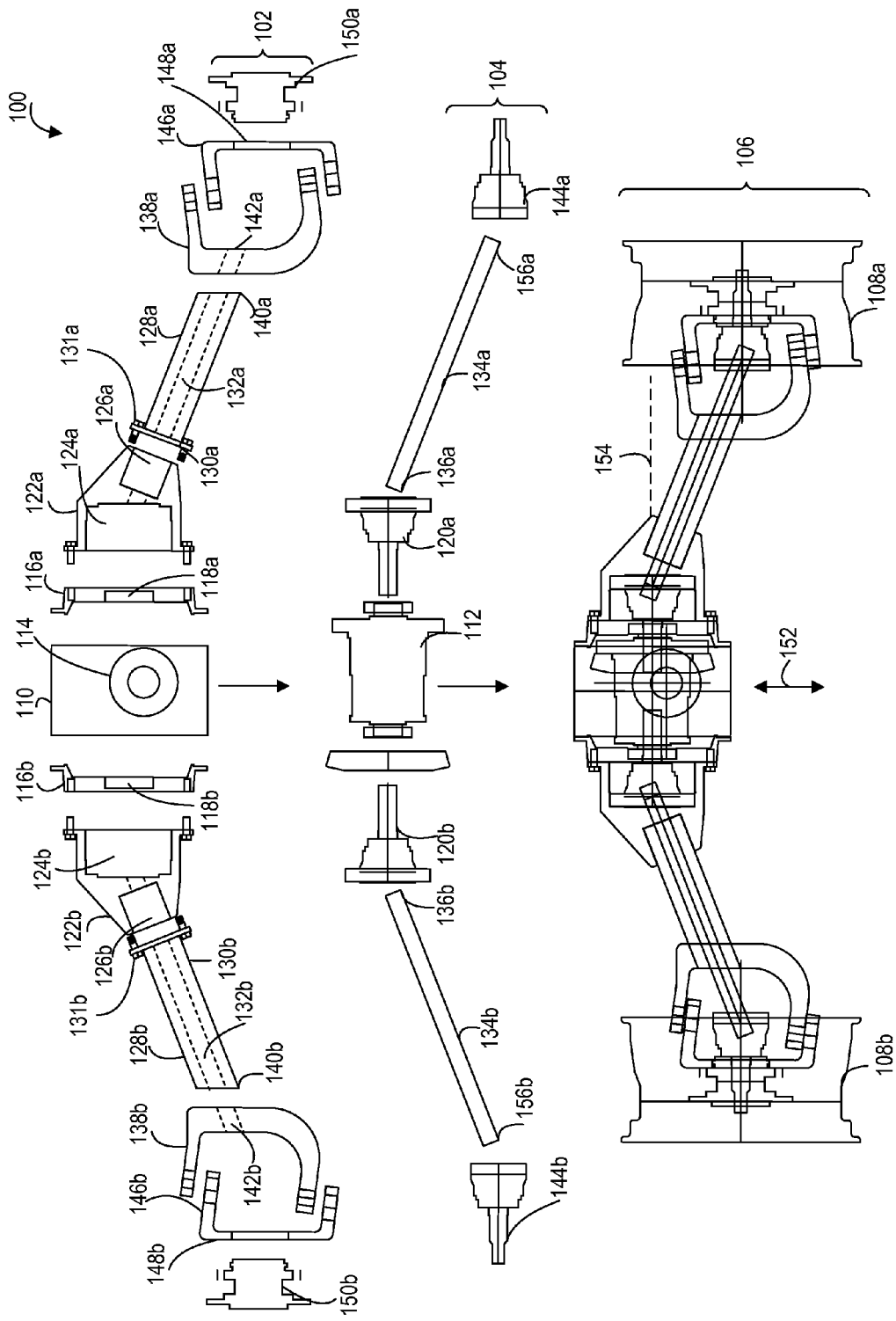
FIG. 1 is a diagram illustrating components suitable for constructing the axle systems in a drop-axle arrangement.

The following detailed description is directed to modular and adjustable axle systems for vehicles. This description is most readily understood with reference to the attached drawings, which include reference numbers whose first digits indicate the drawing in which the corresponding elements are first introduced.

In general, these modular and adjustable axle systems may be configured in a drop-axle arrangement or in a straight-axle arrangement. For conciseness of description, and to avoid duplication, some features of the axle systems may be described in connection with one configuration or the other. However, these features may also be incorporated into the other configuration, unless expressly noted to the contrary. Note that the use of CV joints is not indicated for the alternative straight axle configuration due to the horizontal alignment of the components.

Whether configured in the drop-axle arrangement or in the straight-axle arrangement, the axle systems as described herein may be incorporated into a variety of different vehicles. For example, these vehicles may provide all-terrain or off-road travel capabilities, but may also enhance on-road capability as well. As described in further detail below, some implementations of these axle systems may also be incorporated into vehicles that provide specific lifting and/or carrying capabilities (e.g., forklifts, or other suitable machinery operating within warehouse environments, or the like).

FIG. 1 illustrates components, denoted generally at 100, suitable for constructing the axle systems in a drop-axle arrangement. More specifically, FIG. 1 includes individual housing components, denoted collectively at 102, as well as individual drivetrain components, denoted collectively at 104. FIG. 1 also illustrates an assembled axle system 106 that includes the housing components 102 and the drivetrain components 104. The assembled axle system 106 may include wheels 108a and 108b (collectively, wheels 108), which are shown installed onto the ends of the axle system 106.

Turning to the individual housing components 102 and drivetrain components 104 in more detail, these housing components 102 may include a central differential housing 110. The term "central" as used in this context refers to locating the differential housing 110 somewhere between the ends of the axle system 106. However, the differential housing 110 may or may not be in the exact center of the axle system 106, but instead may be offset to one side or the other as appropriate or suitable in different implementations. For example, if the axle system 106 is implemented as a rear axle that is driven by a driveshaft originating at the transmission output, the differential housing 110 may be approximately in the center of the axle system 106. However, if the axle system 106 is implemented as a front axle that is driven by a driveshaft in a four-wheel drive or all-wheel drive vehicle, the differential housing 110 may be offset to one side or the other, to align with the output of an offset transfer case.

Turning to the differential housing 110 in more detail, this housing may be sized as appropriate to contain a differential 112. The differential 112 may be available commercially from a variety of different vendors, and chosen as appropriate for different applications. For example, the differential 112 may be characterized as open, locked, lockable, or limited slip. In addition, the differential 112 may be further characterized as having forward rotation or reverse rotation, depending on whether the axle system 106 is serving as a front axle or a rear axle. The differential 112 may also be characterized as a high-pinion or low-pinion differential, depending on the height of the point of origin of the input driveshaft.

The differential housing 110 may define an opening 114, through which the input driveshaft may pass. FIG. 1 omits the input driveshaft, only for clarity of illustration. The differential housing 110 may also include any flanges, seals, or other appropriate mechanisms suitable for connecting to and receiving the input driveshaft.

Regarding the interior of the differential housing 110, this housing may define or include any suitable mechanisms for mounting the differential 112 within the differential housing 110. In addition, the interior of the differential housing 110 may incorporate mechanisms for lubricating the pinion gear within the differential 112. If the differential 112 is a low-pinion gear set, the pinion gear may be bathed in lubricant (e.g., gear oil). However, if the differential 112 is a high-pinion gear set, the pinion gear may be mounted above the ambient level of the lubricant. In these latter scenarios, the differential housing 110 may include structure for capturing the lubricant as splashed by the ring gear during its rotation. The differential housing 110 may also define oil grooves for directing the splashed lubricant so to lubricate the pinion gear.

The housing components 102 may also include retainers 116a and 116b (collectively, retainers 116). These retainers 116 may bolt or otherwise join to the sides of the differential housing 110. Although not shown in FIG. 1 for clarity, gaskets or other suitable structure may seal the gear oil within the differential housing, so that the gear oil does not leak at the junction of the retainers 116 and the differential housing 110.

Turning to the retainers 116 in more detail, the retainers may define respective apertures 118a and 118b (collectively retainer apertures 118), through which shafts of inner constant-velocity (CV) joints 120a and 120b (collectively, inner CV joints 120) may pass. These retainer apertures 118 may incorporate seals, O-rings, or other mechanisms to prevent gear oil within the differential housing 110 from leaking through the retainers 116. In addition, the retainers 116 may mechanically isolate or separate the inner CV joints 120 from the differential 112, such that if the differential experiences mechanical failure, the retainers 116 may reduce the risk that fragments of the differential would reach and damage the CV joints 120. Similarly, if the inner CV joints 120 fail mechanically, the retainers 116 may minimize the risk that fragments of the CV joints 120 may reach and damage the differential 112. In this manner, the retainers 116 may reduce the risk that failures in the differential 112 may cause the inner CV joints 120 also to fail, and vice versa.

The retainers 116 may also provide a measure of structural reinforcement for the differential housing 110, once the retainers are bolted or otherwise joined onto the differential housing 110. As discussed throughout this description, the differential housing 110 may be generally cylindrical in nature, and thus benefits from the structural rigidity inherent in curved, arched, or circular structures. The retainers 116 may be generally circular in configuration. Thus, the inherent structural rigidity of the differential housing 110 may be further improved by attaching the retainers 116 to the open sides of the differential housing 110. This inherent structural rigidity can also reduce or eliminate the need for additional armoring or skid plates.

The housing components 102 may also include bell housings 122a and 122b (collectively, bell housings 122). As shown in FIG. 1, the bell housings 122 may bolt or otherwise attach to the retainers 116. In addition, the bell housings 122 may also define interior cavities 124*a* and 124*b* (collectively, cavities 124), sized as appropriate to contain the CV joints 120, and to permit the CV joints 120 to rotate freely therein. The exact dimensions and configuration of the cavities 124 may vary in different implementations.

The bell housings 122 may also define receptacles 126*a* and 126*b* (collectively, receptacles 126) for axle housings 128*a* and 128*b* (collectively, axle housings 128). More specifically, the receptacles 126 may receive inner ends 130*a* and 130*b* (collectively, inner ends 130) of the axle housings 128.

The axle housings 128 may include flanges 131*a* and 131*b* (collectively, flanges 131), for attaching respectively to the bell housings 122*a* and 122*b*. The flanges 131 may be positioned as appropriate along the length of the axle housings, with the positions shown in FIG. 1 chosen only for convenience of illustration. The flanges 131 may be separate parts that are welded or otherwise joined to the axle housings, or may be manufactured as integral components of the axle housings 128.

In addition, the flanges 131 may cooperate with bolts or other mechanisms that are suitable for joining the flanges 131 (and thus, the axle housings 128) to the bell housings 122. Thus, the flanges 131 may define apertures through which the bolts may pass, and the bell housings 122 may define threaded passageways for receiving the bolts.

In the drop-axle configuration shown in FIG. 1, the bell housings 122 may provide the overall axle system 106 with an angled configuration, such that the axle housings 128 are non-linear, or not parallel to one another. However, in the straight-axle configuration shown in other Figures, the axle housings 128 are co-linear or parallel with one another.

Turning to the axle housings 128 in more detail, these housings may be generally elongated and tubular in configuration. The axle housings 128 may define interior passageways 132*a* and 132*b* (collectively, interior passageways 132) that contain corresponding axle shafts 134*a* and 134*b* (collectively, axle shafts 134), with the interior passageways 132 being dimensioned so as to permit the axle shafts 134 to rotate freely therein. The axle shafts 134 may include inner ends 136*a* and 136*b* (collectively, inner ends 136) that are splined or otherwise adapted to engage the inner CV joints 120. In this manner, torque passes from the differential 112, through to the inner CV joints 120 and to the axle shafts 134.

The housing components 102 may also include inner steering knuckles 138*a* and 138*b* (collectively, inner steering knuckles 138), which attach to outer ends 140*a* and 140*b* (collectively, outer ends 140) of the axle housings 128. The inner steering knuckles 138 may be bolted or otherwise joined onto the outer ends 140. In addition, the inner steering knuckles 138 may define apertures or passageways 142*a* and 142*b* (collectively, apertures 142) through which the axle shafts 134 may pass.

Outer CV joints 144*a* and 144*b* (collectively, outer CV joints 144) may receive outer ends 156*a* and 156*b* (collectively, outer ends 156) of the axle shafts 134. More specifically, the outer ends 156 may be splined or otherwise adapted to engage the outer CV joints 144, such that the axle shafts 134 supply torque to the outer CV joints 144.

Outer steering knuckles 146*a* and 146*b* (collectively, outer steering knuckles 146) may pivotally attach to the inner steering knuckles 138. More specifically, the outer steering knuckles 146 may pivot relative to the inner steering knuckles 138 through kingpins, ball joints, or other suitable mechanisms.

Although not shown in FIG. 1 in the interests of clarity, the outer steering knuckles 146 may include tabs or other attachment points for steering linkage or mechanisms, or scenarios in which the axle system 106 is a steerable axle. However, in cases where the axle system 106 is a non-steerable axle, the outer steering knuckles 146 may be in a fixed relationship to the inner steering knuckles 138. For example, in the latter scenario, if the outer steering knuckles 146 include tabs for attaching the steering linkage, the same tabs could provide an attachment point for linkage that locks the outer steering knuckles 146 in fixed relationship with the inner steering knuckles 138.

The outer steering knuckles 146 may define passageways or apertures 148*a* and 148*b* (collectively, passageways 148) through which shafts of the outer CV joints 144 may pass. In addition, wheel spindles 150*a* and 150*b* (collectively, wheel spindles 150) may ride within the passageways 148, and engage the shafts of the outer CV joints 144. As described above with other elements of the drivetrain components 104, the shafts of the outer CV joints 144 may be splined or otherwise adapted to transmit torque to the wheel spindles 150. In turn, the wheels 108 may bolt or otherwise attach to the wheel spindles 150.

Although not shown explicitly in FIG. 1, the axle systems 106 may include any suitable wheel bearings, adapted to facilitate the rotation of the wheel spindles 150 and/or axle shafts 134 as the vehicle travels. The retainers 116 may also include passageways or apertures, which allow lubricants to flow to and from a reservoir in the differential housing 110, so as to lubricate these wheel bearings.

Having described the various housing components 102 and drivetrain components 104, several observations are noted. Turning first to the housing components 102: the retainers 116, the bell housings 122, the axle housings 128, and the inner steering knuckles 138 may be symmetrical, and may be interchangeable across opposite sides of a given axle system 106. Because of these different symmetrical and interchangeable parts, the design of the axle system 106 may minimize the number of spare parts involved in repairing the axle system. In a more specific scenario, if the axle system 106 is incorporated into an all-terrain or off-road vehicle, and the operator of this vehicle often ventures far off-road and away from repair facilities, such operators may wish to transport as few spare parts as possible in order to repair and maintain the axle system 106 while in remote locations. Thus, these operators may carry along as spare parts: one retainer 116, one bell housing 122, one axle housing 128, and/or one inner steering knuckle 138. With these spare parts, the operator could replace either one of the retainers 116*a* or 116*b*, the bell housings 122*a* or 122*b*, the axle housings 128*a* or 128*b*, or the inner steering knuckles 138*a* or 138*b*.

Similar considerations apply to the drivetrain components 104. For example, the CV joints 120 and 144 may be all interchangeable, so that the operator may repair any of the CV joints 120*a*, 120*b*, 144*a*, or 144*b* with a given spare CV joint. In addition, the axle shafts 134 may be interchangeable, assuming that the differential housing 110 is located in the center of the axle system 106 and that the axle shafts 134 thus have equal lengths. Similar description applies to the axle housings 128, which may or may not be interchangeable side-to-side on a given axle, depending on their lengths relative to one another.

In addition, the housing components 102 include a relatively small number of sub-components that are interchangeable with one another. These sub-components may be connected to one another with common interchangeable hardware, such that an operator may repair and replace any of these components with a relatively small number of common hand tools (e.g., wrenches, socket sets, and the like). For example, the housing components 102 may be joined to one another by bolts or other fasteners of the same size and that are operable using the same basic tools.

The foregoing characteristics of the axle systems may further simplify repair of the axle systems 106 in remote locations. In an example scenario, all sub-components of the axle systems 106 may be assembled and/or disassembled using only one size of wrench or socket. In general, the various housing and drivetrain components are bolted together so as to be readily repairable in the field, as compared to being welded or press-fit together.

In the fully-assembled axle systems 106, the drivetrain components 104 are incorporated into the housing components 102. More specifically, when the housing components 102 are assembled with one another, the housing components 102 as a whole provide a rigid structure for containing the various drivetrain components 104. Accordingly, the housing components 102 may maintain the various drivetrain components 104 in a captive relationship with one another. For example, turning to the CV joints 120 and 144, the housing components 102 maintain these CV joints in a fixed angular relationship to one another. If the CV joints 120 and 144 are fixed at a given angle, and do not flex through their full range of motion, the CV joints 120 and 144 may be able to transmit increased torque with greater reliability. Put differently, fixing the CV joints 120 and 144 in a fixed angular relationship may extend the operational lifetimes of these CV joints, while also providing greater torque-handling capability.

Turning to the differential housing 110, it may contain different types of differentials 112. In addition, the differential housing 110 may be interchangeable between different axle systems 106 that serve as front or rear axles within a given vehicle. Thus, a given differential housing 110 that is carried as a spare part may replace a front or rear differential housing that is incorporated into a front or a rear axle system 106.

Referring to the axle system 106 in the drop-axle configuration shown in FIG. 1, this axle system may provide increased ground clearance, as compared to a straight-axle system. FIG. 1 represents this increased ground clearance generally by the arrow 152. The exact amount of this ground clearance may depend upon the angular relationship between the axle housings 128a and 128b. Generally, as the angle between the axle housings 128 increases, the ground clearance decreases, and as the angle between the axle housings 128 decreases, the ground clearance increases. Specific configurations of the housing components 102 may be chosen as appropriate for different implementations.

Figure 2:
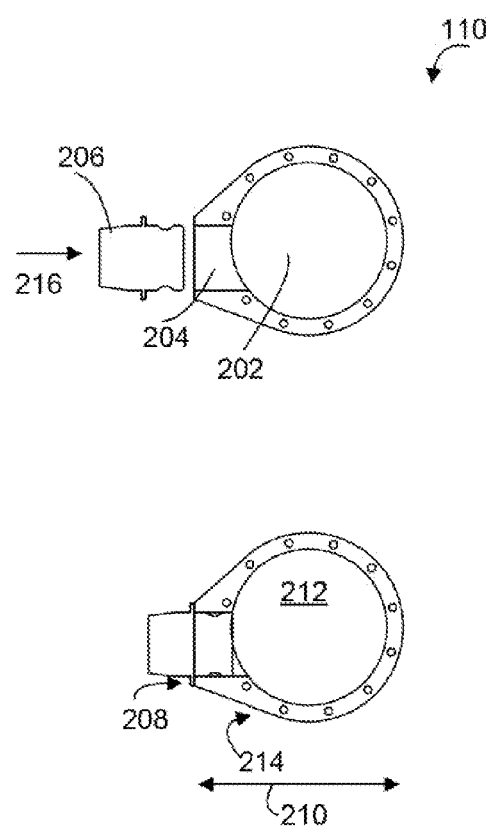
FIG. 2 is a diagram illustrating a differential housing in more detail, as viewed from the side and in isolation from other housing components shown in FIG. 1.

Turning now to FIG. 2, this Figure illustrates the differential housing 110 in more detail, as viewed from the side and in isolation from the rest of the housing components 102. As shown in FIG. 2, the differential housing 110 may define an interior area 202 for containing the differential 112. In addition, the differential housing 110 may define an aperture or passageway 204, through which one end of a driveshaft 206 may pass to interact with the differential 110, as shown generally at 208.

Viewing the differential housing 110 from the side as shown in FIG. 2, the differential housing 110 may be generally cylindrical in configuration, and circular in cross-section. In addition, as detailed further below, the exterior of the differential housing may be generally smooth in character, as distinguished from previous differential housings that may include ribbing or other mechanical reinforcement along their exteriors.

When the differential housings 110 are incorporated into vehicles, these housings may travel relative to the ground in either direction, as represented by the arrow 210. The exact direction of travel may depend on whether the differential housing is incorporated into the front or the rear axle of the vehicle, as well as which direction the vehicle travels primarily. However, referring to the cylindrical configuration of the differential housing 110, it is noted that the axis of this cylinder (denoted generally by the point 212 in FIG. 2, and the line 154 in FIG. 1) is orthogonal to the primary line of travel 210. Thus, as the differential housing 110 travels over terrain, a smooth bottom portion 214 of the differential housing is more able to traverse rough terrain features with less risk of snagging or experiencing damage.

Typically, the bottom portion 214 does not include a flange for mounting a differential cover. Previous differential housings may incorporate exterior ribbed features for structural reinforcement, and may also include mounting flanges for gaskets and differential covers, and the like. In such previous differential housings, these flanges and differential covers are generally perpendicular to the line of travel, and may sometimes snag on protruding terrain features, potentially damaging these previous housings. However, the relatively smooth profile of the bottom portion 214 may reduce the risk of snagging or damaging the overall housing 110, as compared to previous differential housings.

Referring once again to the generally circular cross-section of the differential housing 110, this housing 110 provides a substantially continuous structure around the circumference of this circular cross-section (aside from a relatively small aperture through which the driveshaft 206 passes). In contrast, previous differential housings typically incorporate a removable differential access plate covering the back of the differential housing. Thus, these previous differential housings typically define a relatively large cut-out for accessing and servicing these previous differentials, with the access plate covering this cut-out. Typically, this cut-out is defined on the side of the differential housing, opposite the side where the input driveshaft enters the differential. However, this relatively large cut-out weakens the overall structure of these previous differential housings. Previous differential housings are often referred to as "pumpkins", due to their visual resemblance to pumpkins. However, like pumpkins, these differential housings may be weakened considerably by removing a substantial portion of their outer shell. This provides at least one reason why some previous differential housings have incorporated ribbed reinforcements along their exteriors.

In contrast to previous "pumpkin" differential housings, the cylindrical or circular structure of the differential housings 110 is substantially continuous and uninterrupted, thereby resulting in a stronger overall structure owing to the inherent strength of substantially uninterrupted curved structures. Therefore, the stronger overall structure enables the differential housings 110 to dispense with the exterior ribbing or reinforcements typical of previous differential housings, resulting in a relatively smooth external profile shown in FIG. 2. Thus, the differential housings 110 may provide additional ground clearance, as compared to previous differential housings that incorporate exterior ribbing and exterior flanges. In addition, while the differential housings 110 and the retainers 116 may be joined by seams, the seams would generally run parallel to the line of travel 210, and would be less likely to snag on terrain features and result in damage.

As described previously, the driveshaft 206 transmits incoming torque to the differential 112, as disposed within the differential housing 110. In some scenarios, this incoming torque may result in a torque vector, which is represented by the arrow 216. When the differential is under a torque load, the differential may be subject to shifting somewhat, for example, in response to the torque vector 216. In addition, the differential housing may flex in response to this torque vector. Access covers or plates as provided by previous differential housings may incorporate blocks or other structure for contacting the differential. This structure may counteract the torque vector by supporting the differential from the "back" of the differential housing (i.e., that side of the housing opposite where the drive shaft enters the housing). However, referring to the differential housing 110 as shown in FIG. 2, the inherent strength and rigidity in the substantially uninterrupted and continuous cylindrical housing 110 is better able to resist the torque vector. In addition, because the differential housing 110 is not weakened by a substantial cut-out for the access plate, the differential housing 110 is better able to supprt better to support the differential 112 by relying on the inherent strength of the circular cross-section of the housing 110.

Figure 3:
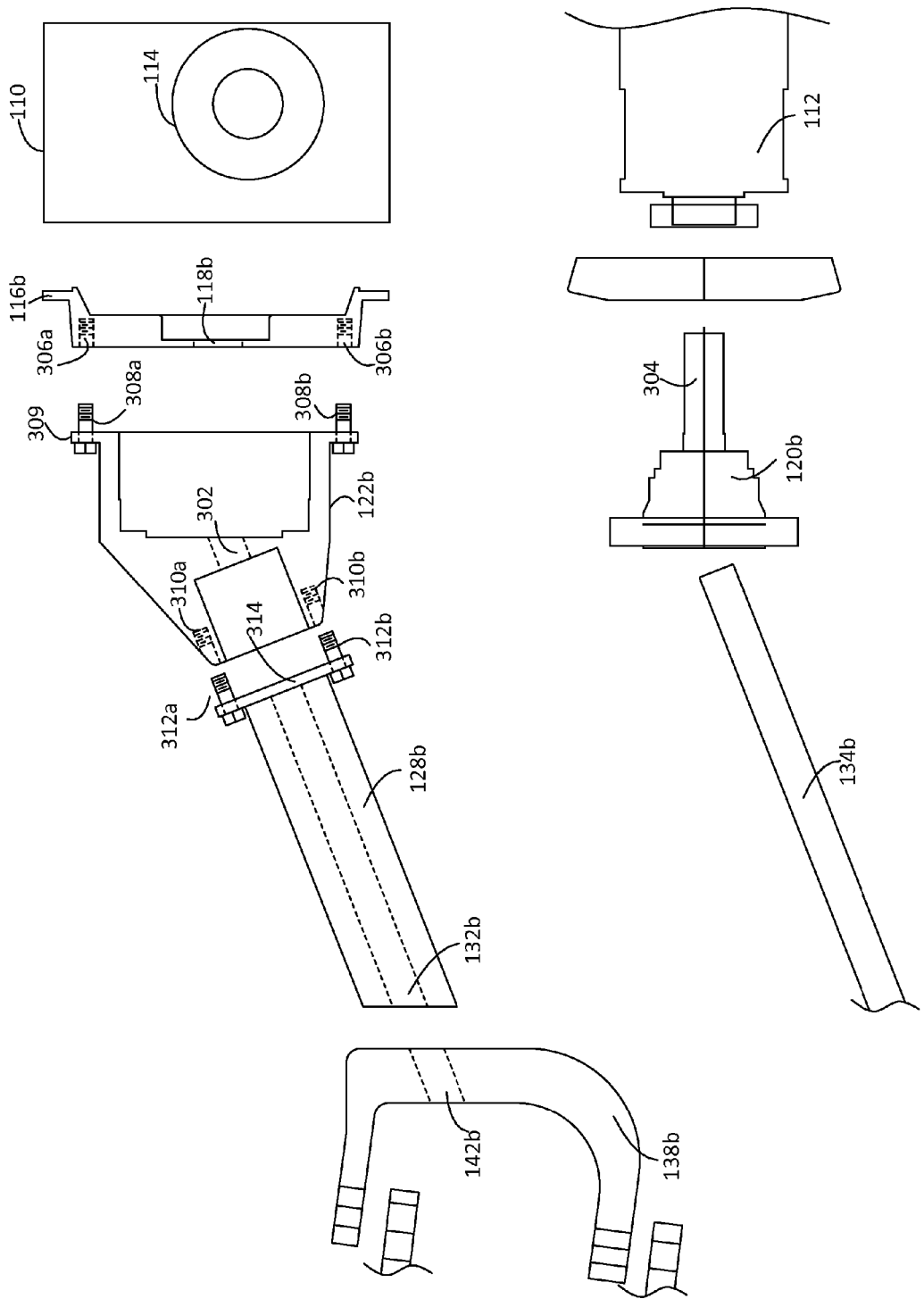
FIG. 3 is a diagram illustrating in more detail certain aspects of housing components and drivetrain components shown in FIG. 1.

FIG. 3 illustrates in more detail certain aspects of the housing components 102 and the drivetrain components 104 from FIG. 1. For ease of reference, but not to limit possible implementations, FIG. 3 carries forward the differential housing 110, the differential 112, the aperture 114 for receiving the input driveshaft (not shown), the retainer 116b, the bell housing 122b, the CV joint 120b, the axle housing 128b, the axle shaft 134b, and the inner steering knuckle 138b.

Turning to these housing components and drivetrain components in more detail, the retainer 116b (as well as other retainers 116) may define an aperture 302 through which a shaft 304 provided by the CV joint 120b may pass. In addition, the retainer 116b may define threaded holes 306a and 306b (collectively, threaded holes 306), which receive bolts 308a and 308b (collectively, bolts 308) for attaching the bell housing 122 to the retainer 116b. As shown in FIG. 3, the bell housing may include a flange 309, through which the bolts 308 may pass.

Turning to the bell housing 122b in more detail, as described above, the bell housing may define a passageway 302 through which the end of the axle shaft 134 may pass, to engage the CV joint 120b. In addition, the bell housing 122b may define threaded holes 310a and 310b (collectively, threaded holes 310), which may receive bolts 312a and 312b (collectively, bolts 312). The bolts 312 may secure the axle housing 128b to the bell housing 122b, with the bolts 312 passing through a flange 314 (which represents the flanges 131 shown in more detail) that is provided by the axle housing 128b.

Figure 4:
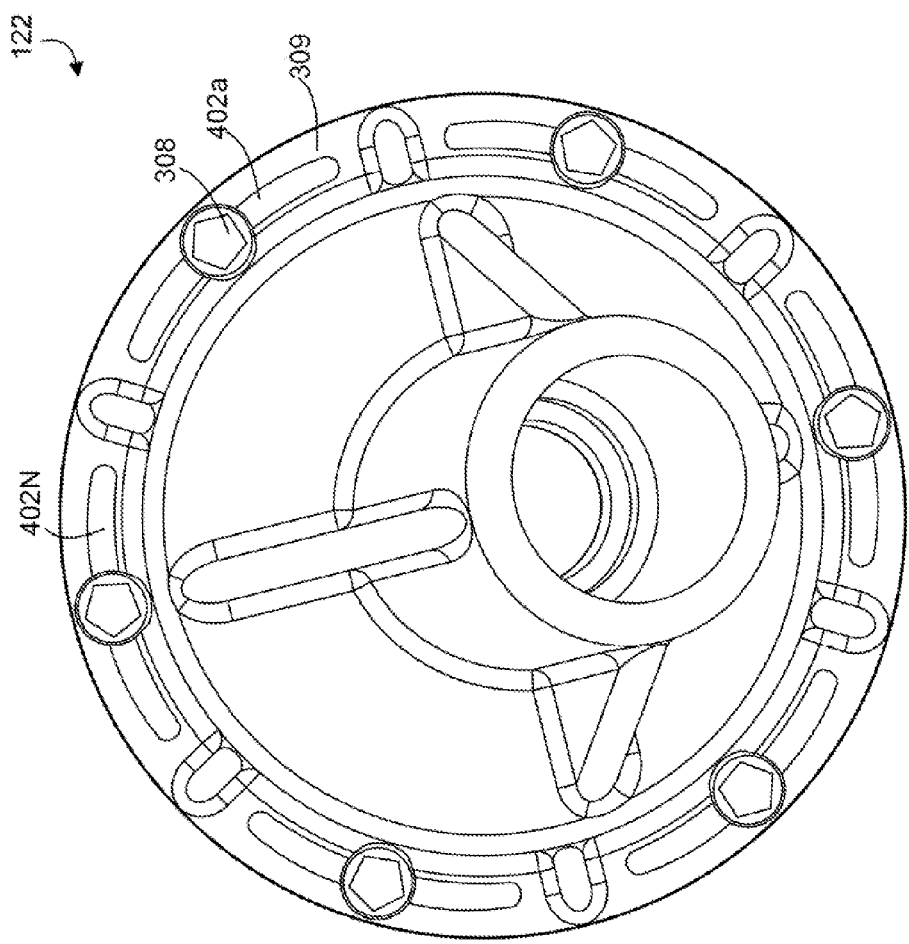
FIG. 4 is a diagram illustrating in more detail bell housings as shown in FIGS. 1 and 3.

FIG. 4 illustrates in more detail the bell housings 122 as shown in FIGS. 1 and 3. As shown in FIG. 4, the bell housings 122 may be generally circular in shape, with the flange 309 providing a mounting surface by which the bell housings 122 may be secured to the retainers 116, using bolts 308. The flange 309 may define any number of slotted apertures 402a and 402n (collectively, slotted apertures 402), which may receive bolts 308.

The slotted apertures 402 provide for rotational adjustment between the bell housings 122 and the retainers 116 (as attached to the differential housing 110). This rotational adjustment can serve several different functions. In a first scenario, referring briefly back to FIGS. 1 and 3, the bell housings 122, the axle housings 128, the inner knuckles 138 and the outer knuckles 146 may be assembled together and considered as one integral sub-assembly. As described previously, the outer knuckles 146 may pivot relative to the inner knuckles 138, along an axis. In implementations where a kingpin joins the inner and outer knuckles, the kingpin would lie along this pivot axis. As also described above, the wheels 108 are attached to the wheel spindles 150, which are joined in rotating relation to the outer knuckles 148. The caster of the wheels 108 refers to the angle between this pivot axis and the vertical. The slotted apertures 402 enable adjustment of the caster of the wheels 108, by allowing the bell housings 122 to rotate relative to the retainers 116.

In another scenario, the slotted apertures 402 may enable rotational alignment of the retainers 116 and the differential housing 110 (considered as one sub-assembly), relative to the bell housings 122. Referring briefly back to FIG. 2, the driveshaft 206 may enter the differential housing 110 at a given angle. This angle may be chosen or specified as appropriate in different applications, so as to minimize wear on any joints in the driveshaft 206, to minimize vibrations within the driveshaft 206, and/or to minimize stress placed upon the pinion gear within the differential 112. The axle systems 106 as described herein enable adjustment of this driveshaft angle, by enabling the differential housing 110 to be clocked, relative to the bell housings 122. The slotted apertures 402 and the bell housings 122 enable this clocking or angular adjustment of the differential housing 110.

In still other scenarios, the slotted apertures 402 may enable two degrees of adjustment within the axle systems 106. First, a specified angle of caster may be achieved by rotating the bell housings 122 relative to the retainer/differential housing sub-assembly 116/110. In addition, a specified driveshaft angle may be achieved by further rotating the retainer/differential housing sub-assembly 116/110 relative to the bell housings 122. Once these adjustments are complete, the bolts 308 may be tightened to an appropriate torque specification, to complete assembly of the axle systems 106. It is noted that the wheel caster and the driveshaft angle may be adjusted individually or together, as appropriate in different implementation scenarios.

While FIG. 4 illustrates the slotted apertures 402 as defined by the bell housings 122, the flanges 314 and 131 may also define similar apertures. These additional apertures as defined by the flanges 314 and 131 may provide additional degrees of adjustment.

Figure 5:
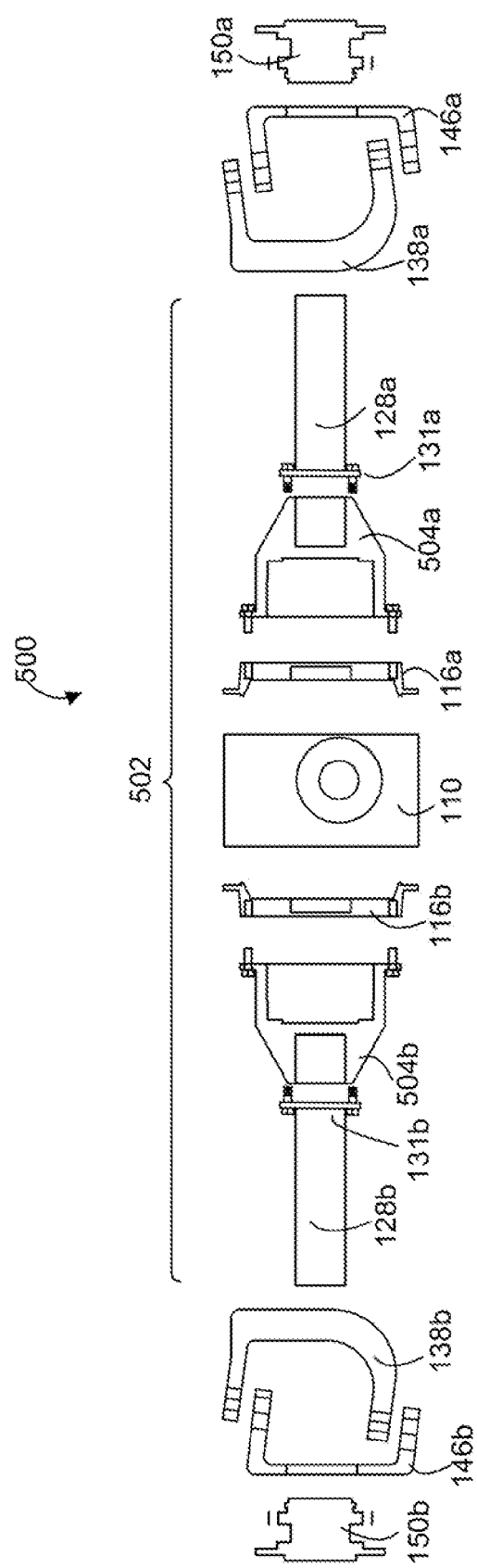
FIG. 5 is a diagram illustrating axle systems that may incorporate housing components that provide an alternative straight-axle configuration.

FIG. 5 illustrates axle systems, denoted generally at 500, that may incorporate housing components 502 to provide a straight-axle configuration. For ease of description, but without limiting possible implementations, the differential housing 110, the retainers 116a and 116b, the axle housings 128a and 128b, the inner knuckles 138a and 138b, the outer knuckles 146a and 146b, and the wheel spindles 150 are carried forward into FIG. 5 from previous Figures. In general, the previous descriptions of these components apply equally to FIG. 5.

The housing components 502 may include the differential housing 110, the retainers 116, and the axle housings 128. In addition, bell housings 504a and 504b (collectively, bell housings 504) provide the axle systems 500 with the straight-axle configuration, as compared to the drop-axle configurations discussed above with FIGS. 1-4. In all other respects, the above descriptions of the bell housings 122 apply equally to the bell housings 504 as shown in FIG. 5.

Figure 6:
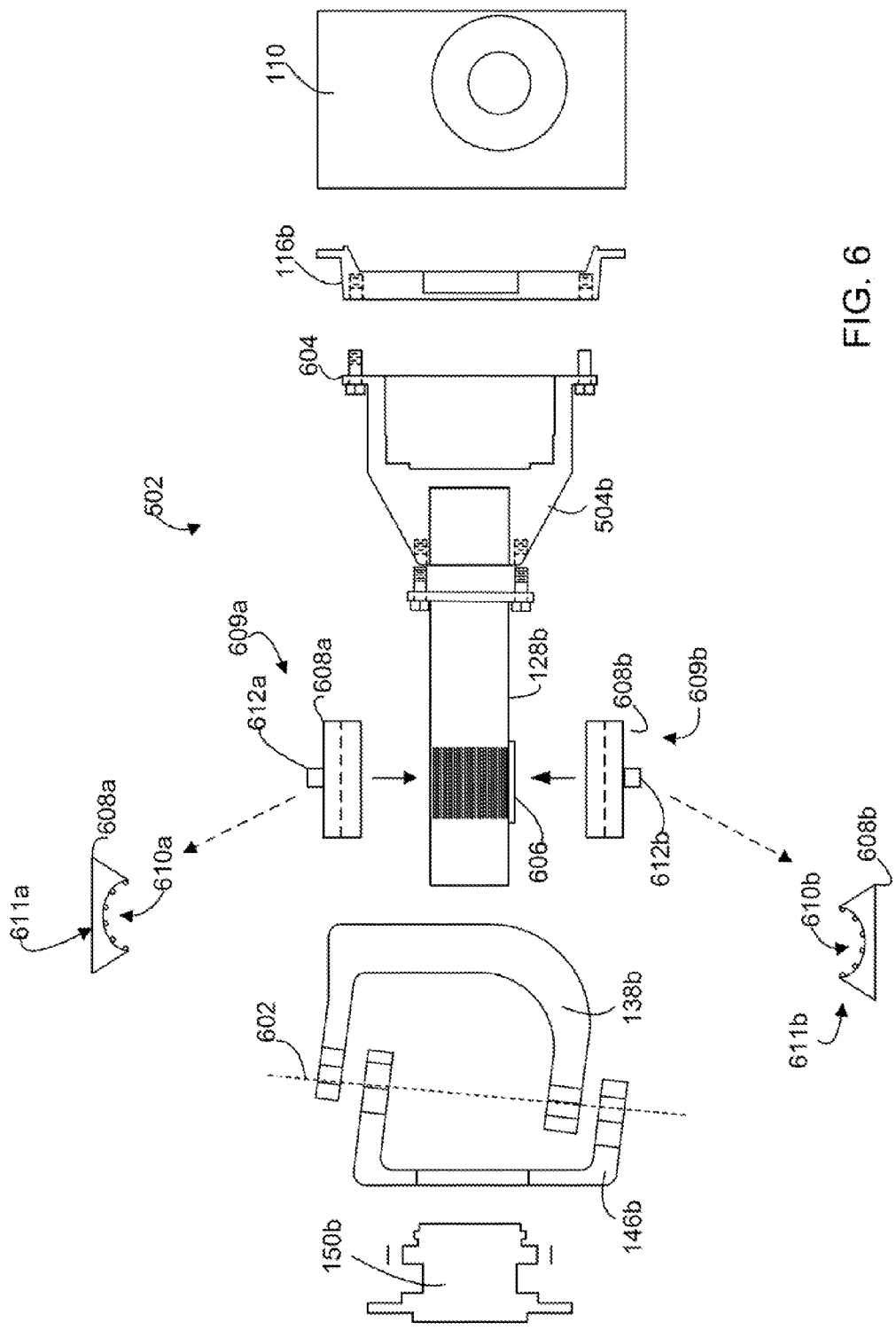
FIG. 6 is a diagram illustrating additional details of housing components for the alternative straight-axle configurations.

FIG. 6 illustrates additional details of some of the housing components 502 as shown in FIG. 5. For ease of reference, but not to limit possible implementations, the differential housing 110, the retainer 116b, the bell housing 504b, the axle housing 128b, the inner knuckle 138b, the outer knuckle 146b, and the wheel spindle 150b are carried forward into FIG. 6. FIG. 6 also illustrates an example steering pivot axis at 602.

As shown in FIG. 6, the bell housings 504b (and more generally, any bell housings 504) may include a flange 604 around the circumference of the bell housings 504. This flange 604 may be similar to the flange 309 shown in FIGS. 3 and 4. The flange 604 may also define a plurality of slotted apertures (not shown in FIGS. 5 and 6) that are similar to those shown in FIG. 4 at 402a and 402n. As discussed above in FIG. 4 with the drop-axle configurations, these slotted apertures 402 may facilitate adjustment of wheel caster and/ or adjustment of driveshaft entry angles. In the straight-axle configurations shown in FIG. 6, slotted apertures defined by the flange 604 may facilitate similar adjustments.

Previous axle housings typically included fixed spring perches, for attaching suitable spring mechanisms to the axles. If these previous axle housings are not rotatable, such fixed spring perches may be suitable. However, the axle housings 128 as described herein may be rotatable, as facilitated by the slotted apertures 402. As shown in FIG. 6, the axle systems as described herein provide spring perches that may accommodate these rotatable axle housings 128.

Turning more specifically to the axle housing 128b as shown in FIG. 6, the exterior of the axle housing may define or include convex splines 606. The axle systems may also include spring perch components 608a and 608b (collectively, spring perch components or spring perches 608). The spring perch components 608a may provide a top or upper block, while the spring perch components 608b may provide a bottom or lower block. Inner surfaces of these spring perch components 608 may define or include respective concave splines 610a and 610b (collectively, concave splines 610) that correspond with and engage the convex splines 606. At 609a and 609b, FIG. 6 illustrates the spring perches 608 as oriented for placement on the axle housing 128b, so as to engage the convex splined surface 606. However, to illustrate the concave splines 610 more clearly, FIG. 6 also includes views 611a and 611b, which illustrate the spring perches 608 rotated 90°, so as to present the concave splines 610.

In example implementations, the individual convex slines 606 and concave splines 610 may occur in 1° increments, such that the spring perches 608 may be adjusted in 1° increments around the axle housing 128. In providing this example, however, it is noted that the splines may be implemented in any suitable pitch, without departing from the scope and spirit of the present description.

In an operational scenario, once the bell housing 504b, the axle housing 128b, the inner knuckle 138b, and the outer knuckle 146b are assembled together, they may be considered as a consolidated sub-assembly. Once this sub-assembly is oriented or rotated into proper alignment with the retainer 116b and the differential housing 110, the spring perches 608 may be mated onto the appropriate splines 606 on the axle housing 128b. In turn, suitable spring systems may be fitted onto the perches 608, with the springs then being secured to the axle housing 128b using any appropriate mechanism (e.g., U-bolts, or the like).

In this manner, the splined axle housing 128b as shown in FIG. 6 may be attached to suitable spring mechanisms, regardless of how the axle housing 128b is rotated or aligned relative to the retainer 116b and the differential housing 110. It is noted that the splined axle housing may be incorporated into the straight-axle configuration, as well as the drop-axle configuration, even though FIG. 6 illustrates a straight-axle configuration only for example.

For clarity of illustration, FIG. 6 does not illustrate any particular spring system. However, it is noted that the various axle configurations described herein (whether characterized as straight-axle or drop-axle configurations) may cooperate with any type of spring system. Examples of such spring systems may include, but are not limited to, leaf springs, coil springs, torsion springs, or any other suitable type of spring system, chosen as appropriate for different applications. Accordingly, the upper or top blocks 608a, as well as the lower or bottom blocks 608b in some cases, may be adapted as appropriate to accommodate different types of spring systems. For example, the spring perches 608 may include posts 612a and 612b (collectively, posts 612) or other structure that is suitable for engaging the spring systems. Without limiting possible implementations, the posts 612 may engage apertures provided by leaf springs.

Figure 7:
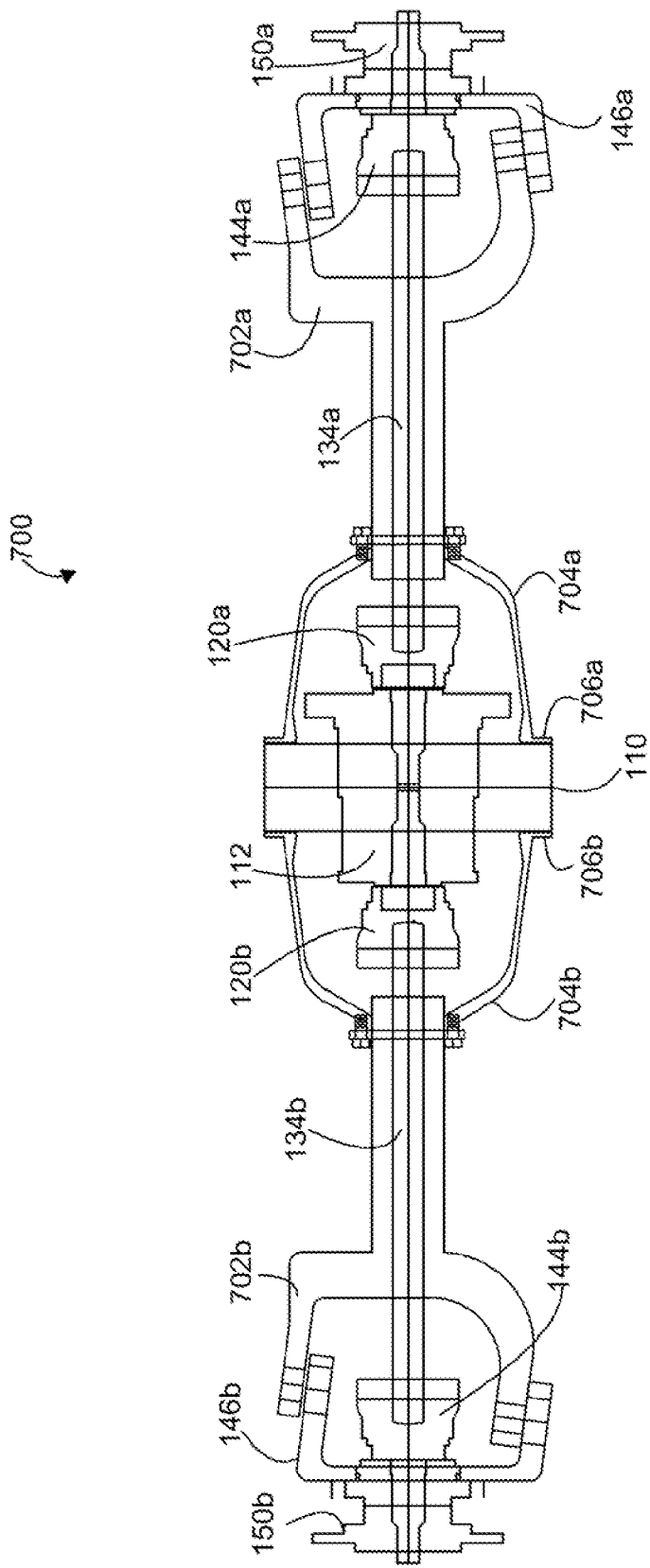
FIG. 7 is a diagram illustrating further examples of straight-axle configurations.

FIG. 7 illustrates additional examples of straight-axle configurations, denoted generally at 700. For ease of reference, but not to limit possible implementations, FIG. 7 carries forward the differential housing 110, as well as the inner CV joints 120a and 120b, the axle shafts 134a and 134b, the outer CV joints 144a and 144b, the wheel spindles 150a and 150b, and the outer knuckles 146a and 146b.

In the straight-axle configurations 700, the axle housings 132 and the inner knuckles 138 that were shown in previous drawings are integrated into combined axle housing and inner knuckle components. FIG. 7 provides examples of such combined housing/knuckle components at 702a and 702b (collectively, combined housing/knuckle components 702).

In addition, the straight-axle configuration 700 may also integrate or combine the retainers 116 and the bell housings 504 into combined retainer/bell housings 704a and 704b (collectively, combined retainer/bell housings 704). These combined retainer/bell housings 704 may also include flanges 706a and 706b (collectively, flanges 706). The flanges 706 may define slotted apertures (not shown in FIG. 7), which provide rotation and alignment capabilities similar to those capabilities discussed above with the slotted apertures 402 shown in FIG. 4.

In some implementations of the straight-axle configurations 700, the inner CV joints 120 may serve as a type of mechanical fuse. More specifically, for a variety of reasons, the differential 112 may experience severe torque loads or overloads. Without the inner CV joints 120 in place, the severe torque load may be transmitted directly to the axle shafts 134a and 134b, potentially breaking axle shafts 134. In typical scenarios, the axle shafts 134 are more expensive and more difficult to replace than the inner CV joints 120. Therefore, if the inner CV joints 120 are rated to fail at a torque rating that is lower than what would damage the axle shafts 134, then the inner CV joints 120 would fail before the axle shafts 134 are damaged. Once the inner CV joints 120 fail, any torque overload would then dissipate.

If the inner CV joints 120 serve as mechanical fuses, and fail due a torque overload, these failed CV joints 120 may be replaced by removing the combined retainer/bell housings 704 from the differential housing 110, replacing any broken CV joints 120, and reinstalling the retainer/bell housings 704 onto the differential housing 110. The mechanical-fuse capabilities provided by the straight-axle configurations 700 may be particularly suitable when the axle shafts 134a and 134b have unequal lengths and are thus not interchangeable with one another. In these scenarios, operators may replace any failed CV joints 120 relatively easily, as compared to replacing the axle shafts 134, allowing the operators to carry extra CV joints 120 as spare parts, rather than carrying extra axle shafts 134 (and possible axle shafts having different lengths).

As shown in FIG. 7, the straight-axle configurations 700 may include four CV joints 120 and 144 in total. In addition to the mechanical fuse capabilities described above, the straight-axle configurations 700 may also be suitable when a given vehicle is equipped with uniform front and rear axles. In such vehicles, for example, both axles may be steerable, or at least may be made steerable. Accordingly, the straight-axle configurations 700 may include the outer CV joints 144 if the axle is steerable. In these scenarios, parts may be swapped from front to rear axles, to repair either of the axles as appropriate. As described above, a given axle may be converted selectively to non-steerable mode by locking the outer knuckles 146 to the inner knuckles 138 or 702.

Figure 8:
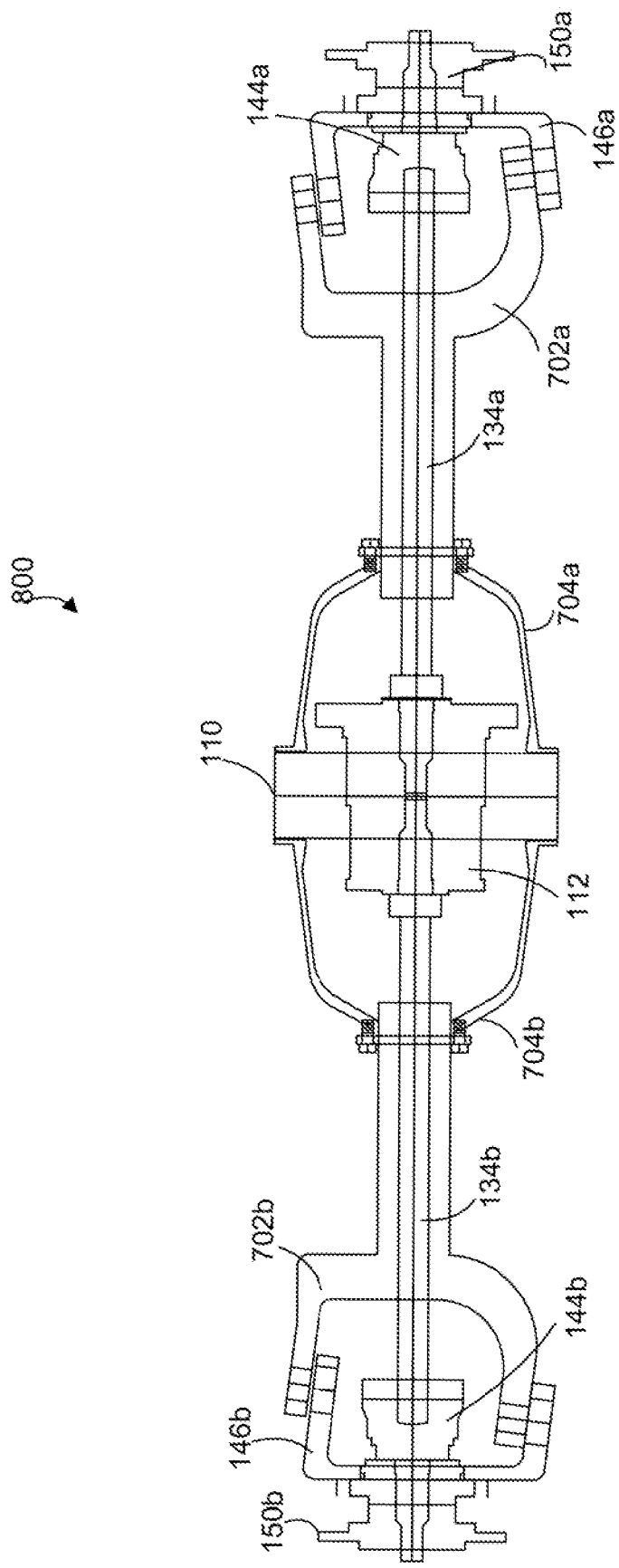
FIG. 8 is a diagram illustrating additional examples of straight-axle configurations.

FIG. 8 illustrates additional examples of straight-axle configurations, denoted generally at 800. For ease of reference, but not to limit possible implementations, FIG. 8 carries forward the differential housing 110, as well as the differential 112, the combined bell housing and retainers 704a and 704b, the axle shafts 134a and 134b, the combined inner knuckles and axle housings 702a and 702b, the outer CV joints 144a and 144b, the outer knuckles 146a and 146b, and the wheel spindles 150a and 150b.

The straight-axle configurations 800 omit the inner CV joints 120a and 120b shown in FIG. 7, trading-off the mechanical fuse capabilities of these inner CV joints in favor of reduced part count and cost. In the examples shown in FIG. 8, the axle shafts 134 engage directly with the differential 112.

As described above with FIG. 1, the retainers 116a and 116b may separate the differential 112 from the inner CV joints 120a and 120b. In this manner, the retainers 116 may reduce the risk of fragments from a failed differential 112 contaminating the inner CV joints 120, and vice versa. However, in the scenarios shown in FIG. 8, there are no inner CV joints 120 to be contaminated by fragments from a failed differential 112. Accordingly, the retainers 116 may be integrated into the bell housings 122, to provide the integrated retainers/bell housings 704.

In implementations in which the straight-axle configurations 800 are steerable, or may be made steerable, these configurations 800 may include the outer CV joints 144. However, in cases where steering capability is not desired, the straight-axle configurations 800 may omit the outer CV joints 144, engaging the axle shafts 134 directly with the wheel spindles 150.

Although some of the above description relates to axle systems incorporated into on-road or off-road vehicles, these axle systems may also be incorporated into other vehicles, without departing from the scope and spirit of this description. Examples of such other vehicles may include vehicles that are designed specifically to perform certain roles (e.g., lifting and moving heavy payloads, or the like). More specific examples may include forklifts or other similar vehicles.

When designing such specialized, weight-lifting vehicles, one design factor often considered is moving the front wheels of such vehicles forward within the vehicle, so as to reduce the amount of counterweight provided at the rear of the vehicles. By reducing the amount of counterweight, the cargo-moving capacity of the vehicle may be increased, and the fuel consumption of the vehicle may be decreased. The drop-axle configuration may be particularly suitable for some of these other types of vehicles.

As a more concrete example of applying portions of this description to such weight-moving vehicles, the discussion returns to the drop-axle configuration as shown in FIG. 1. This Figure illustrates how the drop-axle configuration may provide increased ground clearance, as represented at 152. The drop-axle configuration achieves this increased ground clearance by dropping the wheels 108 "downwards", thereby raising the differential housing 110 "upwards" away from the ground and providing the increased ground clearance. However, if the wheels 108 are moved "forwards" rather than "downwards", the drop-axle configuration may provide a wheels-forward arrangement suitable for forklifts or other types of specialized, weight-lifting vehicles.

This wheels-forward arrangement may be achieved by rotating the bell housings 122 relative to the differential housing 110, so that the axle shafts 134 and axle housings 128 are generally horizontal. This arrangement of the vehicle would place the wheels 108 ahead of the differential housing 110 and differential 112. In addition, a lift mechanism provided by the vehicle may be located between the differential housing 110 and the wheels 108, further shifting the vehicle's center of mass toward the rear of the vehicle, and possibly allowing further reduction of the counterweight at the rear.

As described above, the CV joints as incorporated into the various axle systems provided in this description may be "captive", in the sense that these CV joints do not flex throughout their entire range of motion, but are instead locked in one angular configuration. As also described above, such captive CV joints may offer longer life and increased torque-handling capacity. In the wheels-forward arrangement, these captive CV joints may increase the load carrying capacity provided by these weight-lifting vehicles.

Throughout this discussion, this description refers to "CV joints" as a general term of reference, but use of this term does not limit possible implementations of this description. In some implementation scenarios, universal joints (i.e., U-joints) may be suitable. Turning to CV joints more specifically, a variety of different CV joints may be suitable, according to the circumstances of different particular applications. Suitable CV joints may be available from a variety of different vendors. Examples of such CV joints may include, but are not limited to, Thompson couplings, Rzeppa CV joints, Tripod CV joints, Double Cardan CV joints and the like.

It is noted that the various drawing Figures provided with this description are not drawn to scale. Instead, these Figures illustrate various features only for the purposes of facilitating this description. Thus, it is noted that items shown in these various Figures are not drawn to show exact proportions, sizes, or scale.

The subject matter described above is provided by way of illustration only and should not be construed as limiting. Various modifications and changes may be made to the subject matter described herein without following the example embodiments and applications illustrated and described.

I claim:

1. An axle housing system for a vehicle, the axle system comprising:
   a central differential housing;
   first and second retainers attached to opposite sides of the differential housing;
   first and second bell housings attached respectively to the first and second retainers, wherein each of the first and second bell housings comprises a mounting flange configured to attach the bell housing to the first or second retainer, wherein the mounting flange comprises a plurality of slotted apertures configured to allow for rotational adjustment between the bell housing and the first or second retainer;
   first and second axle tube housings having proximal ends attached respectively to the first and second bell housings; and
   first and second inner steering knuckles attached respectively to distal ends of the first and second axle tube housings.

2. The axle housing system of claim 1, wherein the first and second bell housings are configured to fixedly attach to the first and second axle tube housings in a non-linear arrangement such that the first and second axle tube housings attach to the first and second bell housings at a non-zero angle from an axis laterally bisecting the central differential housing.

3. The axle housing system of claim 2, wherein the non-zero angle comprises a non-zero angle in a downward direction such that an installed axle housing system in the vehicle would provide a drop-axle configuration in which the central differential housing is positioned higher than the first and second inner steering knuckles to provide a ground clearance between a ground and the proximal ends of the first and second axle tube housings that is greater than the ground clearance between the ground and the distal ends of the first and second axle tube housings.

4. The axle housing system of claim 2, wherein the non-zero angle comprises a non-zero angle in a forward or rearward direction such that an installed axle housing system in the vehicle would provide a configuration in which the first and second inner steering knuckles are positioned forward or rearward, respectively, of the axis laterally bisecting the central differential housing.

5. The axle housing system of claim 1, wherein the first and second retainers are configured to mechanically isolate a differential within the central differential housing from first and second inner constant velocity (CV) joints connected to opposite sides of the differential and substantially disposed within the first and second bell housings.

6. The axle housing system of claim 1, wherein each component of the axle housing system is symmetrical such that the first and second retainers are interchangeable, the first and second bell housings are interchangeable, the first and second axle tube housings are interchangeable, and the first and second inner steering knuckles are interchangeable.

7. The axle housing system of claim 6, wherein each component of the axle housing system is removably attached to an adjacent component using a plurality of interchangeable fasteners.

8. The axle housing system of claim 1, wherein the central differential housing comprises a substantially cylindrical configuration having a substantially circular cross-section.

9. The axle housing system of claim 1, wherein the plurality of slotted apertures provide for adjustment of an angle of wheel caster and for adjustment of a driveshaft angle.

10. The axle housing system of claim 1, wherein each of the first and second axle tube housings comprises a mounting flange configured to attach the axle tube housing to the first or second bell housing.

11. The axle housing system of claim 1, wherein the first and second axle tube housings each comprise an adjustable spring perch configured to attach a spring mechanism to the axle tube housing and to incrementally adjust an attachment location of the adjustable spring perch around at least a portion of a circumference of the axle tube housing.

12. An axle system for a vehicle, comprising:
a fixed axle housing system, the fixed axle housing system comprising
a central differential housing comprising a substantially cylindrical configuration having a substantially circular cross-section,
first and second retainers attached to opposite sides of the central differential housing,
first and second bell housings attached to opposite sides of the central differential housing via the first and second retainers, wherein each of the first and second bell housings comprises a mounting flange configured to attach the bell housing to the first or second retainer, wherein the mounting flange comprises a plurality of slotted apertures configured to allow for rotational adjustment between the bell housing and the first or second retainer,
first and second axle tube housings having proximal ends attached respectively to the first and second bell housings, and
first and second inner steering knuckles attached respectively to distal ends of the first and second axle tube housings; and
a drivetrain system disposed within the fixed axle housing system, the drivetrain system comprising
a differential disposed within the central differential housing,
first and second inner CV joints having proximal ends attached to opposite sides of the differential and disposed within the first and second bell housings via the first and second retainers, and wherein the first and second retainers are configured to mechanically isolate the first and second inner CV joints from the differential,
first and second axle shafts having proximal ends attached respectively to distal ends of the first and second inner CV joints and disposed within the first and second axle tube housings, and
first and second outer CV joints having proximal ends attached respectively to distal ends of the first and second axle shafts.

13. The axle system of claim 12, wherein the fixed axle housing system maintains the first and second inner CV joints and the first and second outer CV joints in a fixed non-zero angular relationship to one another.

14. The axle system of claim 12, wherein the first and second bell housings are configured to fixedly attach to the first and second axle tube housings in a non-linear arrangement such that the first and second axle tube housings attach to the first and second bell housings at a non-zero angle from an axis laterally bisecting the central differential housing.

15. An axle system for a vehicle, comprising:
a fixed axle housing system, comprising a central differential housing having from each of two opposing sides of the central differential housing:
a bell housing attached to the central differential housing via a retainer utilizing a mounting flange comprising a plurality of slotted apertures configured to allow for rotational adjustment between the bell housing and the retainer, the bell housing configured to encompass an inner CV joint and an end of an axle shaft attached to the inner CV joint, and to define a fixed drop angle corresponding to a non-zero angle from horizontal through which an axle shaft is directed from the central differential housing,
an axle tube housing fixedly attached to the bell housing according to the non-zero angle from horizontal,
a steering knuckle attached to the axle tube housing and configured to allow for pivotal movement of a wheel spindle with respect to the axle tube housing; and
a drivetrain system, comprising a differential positioned within the central differential housing and having from each of two opposing sides of the differential:
the inner CV joint attached to the differential and disposed within the bell housing,
an axle shaft attached to the inner CV joint and disposed within the axle tube housing according to the non-zero angle from horizontal, and
an outer CV joint attached to the axle shaft and configured for attachment to the wheel spindle.

16. The axle system of claim 15, wherein the rotational adjustment provides for adjustment of an angle of wheel caster and for adjustment of a driveshaft angle.

17. An axle system for a vehicle, comprising:
a fixed axle housing system, the fixed axle housing system comprising
   a central differential housing,
   first and second bell housings attached to opposite sides of the central differential housing,
   first and second axle tube housings having proximal ends attached respectively to the first and second bell housings, and
   first and second inner steering knuckles attached respectively to distal ends of the first and second axle tube housings; and
a drivetrain system disposed within the fixed axle housing system, the drivetrain system comprising
   a differential disposed within the central differential housing,
   first and second inner CV joints having proximal ends attached to opposite sides of the differential and disposed within the first and second bell housings,
   first and second axle shafts having proximal ends attached respectively to distal ends of the first and second inner CV joints and disposed within the first and second axle tube housings, wherein the first and second inner CV joints are rated to fail at a torque rating that is lower than a torque rating of the first and second axle shafts, respectively, such that the first and second inner CV joints are configured as mechanical fuses to protect the first and second axle shafts from excessive torque loads, and
   first and second outer CV joints having proximal ends attached respectively to distal ends of the first and second axle shafts.

* * * * *